United States Patent
Hasuo et al.

(10) Patent No.: US 8,456,057 B2
(45) Date of Patent: Jun. 4, 2013

(54) LAMINATED STATOR CORE

(75) Inventors: Yusuke Hasuo, Kitakyushu (JP); Kazunori Ouchi, Kitakyushu (JP)

(73) Assignee: Mitsui High-Tec, Inc., Kitakyushu-shi, Fukuoka (JP)

(*) Notice: Subject to any disclaimer, the term of this patent is extended or adjusted under 35 U.S.C. 154(b) by 309 days.

(21) Appl. No.: 12/953,902

(22) Filed: Nov. 24, 2010

(65) Prior Publication Data

US 2011/0127876 A1 Jun. 2, 2011

(30) Foreign Application Priority Data

Dec. 1, 2009 (JP) ................................ 2009-273705

(51) Int. Cl.
*H02K 1/06* (2006.01)
*H02K 1/18* (2006.01)
*H02K 1/28* (2006.01)

(52) U.S. Cl.
USPC ...... 310/216.057; 310/216.018; 310/216.044; 310/216.058; 310/216.113; 310/216.009

(58) Field of Classification Search
USPC ...... 310/48.01, 49.34, 12.17, 254.1, 216.113, 310/216.004, 216.009, 216.018, 216.044, 310/216.057, 216.058
See application file for complete search history.

(56) References Cited

U.S. PATENT DOCUMENTS

| | | | |
|---|---|---|---|
| 5,539,974 A * | 7/1996 | Isayama | 29/598 |
| 6,718,616 B2 * | 4/2004 | Fukui et al. | 29/596 |
| 8,286,331 B2 * | 10/2012 | Hashimoto | 29/596 |
| 2001/0015589 A1 * | 8/2001 | Sakagami et al. | 310/217 |
| 2002/0114824 A1 * | 8/2002 | Fukui et al. | 424/432 |
| 2007/0013255 A1 * | 1/2007 | Wakitani et al. | 310/216 |
| 2009/0195110 A1 * | 8/2009 | Miyake et al. | 310/216.058 |

FOREIGN PATENT DOCUMENTS

| | | |
|---|---|---|
| JP | 2887428 B2 | 4/1999 |
| JP | 29555804 B2 | 10/1999 |

* cited by examiner

*Primary Examiner* — Tran Nguyen
*Assistant Examiner* — Terrance Kenerly
(74) *Attorney, Agent, or Firm* — Westerman, Hattori, Daniels & Adrian, LLP (57) ABSTRACT

A laminated stator core 10, formed by laminating stator core sheets 17, each of the stator core sheets 17 punched out from a magnetic metal sheet 32 so as to have a common axis with a rotor core sheet 36 which punched out from the magnetic metal sheet 32 before the stator core sheet 17 is punched out; the stator core sheet 17 including a thin section 24 in a magnetic pole shaft piece 20; the thin section 24 formed by pressing a part or a whole of a magnetic pole shaft piece 20 in a thickness direction, and elongating the same in a radially inward direction; and further the thin section 24 having a thickness within 50-95% of that of the magnetic metal sheet 32 and a radial length within 30-100% of that of the magnetic pole shaft piece 20. This enables a magnetic pole piece 19 to be elongated to form the thin section 24 without adverse effect on magnetic characteristics thereof, and improves caulking accuracy and dimensional accuracy for blanking both of the core sheets 17, 36 from one magnetic metal sheet 32.

6 Claims, 9 Drawing Sheets

FIG. 9(A)  Length 1.0 mm × Depth 0.225 mm

FIG. 9(B)  Length 2.0 mm × Depth 0.113 mm

LAMINATED STATOR CORE

TECHNICAL FIELD

The present invention relates to a laminated stator core, including stator core sheets punched out from a strip material (magnetic metal sheet) with a high yield. The laminated stator core is applicable to a stepping motor, for example, and further has a high productivity and improved magnetic characteristics.

BACKGROUND ART

Conventionally, a stepping motor has a very small air gap between a rotor and a stator, and the rotor and stator are made of rotor core sheets and stator core sheets, respectively. When the rotor core sheet and the stator core sheet are produced from one magnetic metal sheet, small metal clippings are formed in narrow gaps between the rotor core sheet and the stator core sheet. The metal clippings may be broken during a punching operation and not drop into a downside of a die (female die), a part of a die device. And, the punching operation may have to be performed again to remove the metal clippings. What is worse, the die device may be damaged due to clogging of scraps including the metal clippings. In addition, when the rotor core sheet and the stator core sheet are produced from one magnetic metal sheet concentrically (i.e., in a manner that axes of the rotor core sheet and the stator core sheet are aligned with each other), if magnetic pole teeth located radially inward of the stator core sheet can not be punched out in desired shapes, then the rotor core sheet and the stator core sheet need to be punched out with different punches and dies. This results in a low material yield and a high cost.

As an example of the conventional art to solve the above problems, Patent Literature 1 discloses a thin section provided in at least one of the rotor core sheet and the stator core sheet. The thin section is formed by coining and evenly elongating at least one of the core sheets in a thickness direction thereof. With this technique, both of the rotor core sheet and the stator core sheet can be punched out from one magnetic metal sheet using one die device.

CITATION LIST

Patent Literature

[Patent Literature 1] Japanese Patent No. 2955804

SUMMARY OF INVENTION

Technical Problem

However, in Patent Literature 1, the thin section is formed by coining and compressing the magnetic metal sheet in the thickness direction, and thus the magnetic metal sheet is elongated by the volume of the thin section, which is calculated by multiplying a length of a groove by a depth of the groove. Thus, to form the thin section, a coining length and a coining depth of the punch (male die) is set based on the elongation, in other words, there is no clear reference setting for the coining length and the coining depth. Thus, to secure the elongation, the coining depth tends to be set deep; for example, the thickness of the coined thin section is set less than 50% of that of the magnetic metal sheet. For this reason, after the stator core sheets are laminated to be a laminated stator core, magnetic characteristics of the coined thin sections are deteriorated, and torque characteristics of a product (motor) using the laminated stator core are reduced. Therefore, motor characteristics required in advance can not be satisfied.

To solve the problems, the punch needs to be modified, and also the coining length and the coining depth of the die device needs to be reset, which are very complicated operations. Furthermore, if the groove is made deeper to increase the elongation, a magnetic pole tooth piece is bent upwardly, and thus magnetic characteristics are reduced and a form of the laminated stator core cannot be sustained. Additionally, the magnetic metal sheet needs to be deeply pressed by the punch, thus the punch may be damaged due to its insufficient strength.

The present invention has been made in view of the above circumstances and has an object to provide a laminated stator core, in which a magnetic pole piece is elongated by forming a thin section without adverse effect on magnetic characteristics of the magnetic pole piece. Further, the laminated stator core can improve interlocking (caulking) accuracy as well as dimensional accuracy for blanking a rotor core sheet and a start core sheet from one magnetic metal sheet.

Solution to Problem

To accomplish the above object, the present invention provides a laminated stator core, formed by laminating stator core sheets, each of the stator core sheets punched out from a magnetic metal sheet so as to have a common axis with a rotor core sheet, the rotor core sheet punched out from the magnetic metal sheet before the stator core sheet is punched out, each of the stator core sheets comprising: a yoke piece; a plurality of magnetic pole shaft pieces integrally formed inside the yoke piece; and a magnetic pole tooth piece integrally formed inside each of the magnetic pole shaft pieces, wherein each of the magnetic pole shaft pieces is provided with a thin section; the thin section is formed by pressing a part or a whole of the magnetic pole shaft piece in a thickness direction thereof, and elongating the magnetic pole shaft piece in a radially inward direction; and further each of the thin sections has a thickness within 50-95% of that of the magnetic metal sheet and a radial length within 30-100% of that of the magnetic pole shaft piece.

If the thickness of the thin section is less than 50% of that of the magnetic metal sheet, magnetic characteristics are reduced, which makes it difficult to produce a motor with a larger torque. If the thickness of the thin section exceeds 95% of that of the magnetic metal sheet, the elongation at the formation of the thin section is not sufficient to achieve the aim of the present invention. In the laminated stator core according to the present invention, the thin section is formed between a radially outward end and a radially inward end of the magnetic pole shaft piece. If the laminated stator core includes the magnetic pole shaft pieces each having curved corners viewed from the above, each of the thin sections is preferably formed between the radially outward end of the magnetic pole tooth piece and the radially inward end of the yoke piece, both excluding curved portions (i.e., straight area of the magnetic pole shaft piece).

In the laminated stator core according to the present invention, it is preferable that boundary sections radially adjoining to a groove forming the thin section have slanted surfaces or arcuate surfaces, the slanted surfaces or the arcuate surfaces continuing to a bottom surface of the groove. This solves a discontinuity (irregularity) in the material thickness in the radial direction, thereby smoothing flow of magnetic flux.

In the laminated stator core according to the present invention, a groove forming the thin section is provided in a topside or an underside of the magnetic pole shaft piece, or grooves forming the thin section are provided in the topside and the underside of the magnetic pole shaft piece. In the case that the magnetic pole shaft piece includes the grooves in the topside and the underside, the upward bend of the magnetic pole piece can be reduced, compared to the case that the magnetic pole shaft piece includes the groove in one side of the magnetic pole shaft piece.

In the laminated stator core according to the present invention, it is preferable that the grooves, respectively formed in the topside and the underside of the magnetic pole shaft piece, have the same radial length and are provided at the same radial position of the magnetic pole shaft piece.

In the laminated stator core according to the present invention, it is preferable that the thin section is formed by a straight groove. In this case, the punch can be easily customized and maintained. However, if the thin section is formed by an arcuate groove having a uniform radial length, an arcuate punch is required, which is comparatively difficult to be customized.

In the laminated stator core according to the present invention, each of the magnetic pole shaft pieces is provided with a plurality of grooves forming the thin sections. This configuration allows even a compact punch to secure the elongation required for the magnetic pole shaft piece, when a large punch cannot be used in terms of a layout of the die device.

Advantageous Effects of Invention

In the laminated stator core according to the present invention, the magnetic metal sheet is processed by one press machine, and the stator core sheet and the rotor core sheet are punched out from the magnetic metal sheet so as to have a common axis. Additionally, the thin sections are respectively formed on the same radial position in the magnetic pole shaft pieces of the stator core sheet, in a manner that each of the thin sections has a long radial length and each of the grooves of the thin sections has a shallow depth. Therefore, the irregularity on the surface of the magnetic pole shaft piece is reduced, thereby decreasing deterioration in magnetic characteristics of the magnetic pole piece. As a result, deterioration in motor characteristics is decreased.

The thickness of the thin section is 50-90% of the material thickness, and the radial length of the thin section is 30-100% of that of the magnetic pole shaft piece, which facilitates settings of the punch (male die) used in manufacturing operation. In addition, the punch (male die) is set based on the elongation, in other words, the thickness and the radial length of the thin section are properly selected. Thus, the magnetic characteristics of the stator core sheets are improved, decreasing the reduction in torque characteristics of the finished product (motor).

Further, the resetting of the die (punch) including the modification of the punch, which is required if the finished product does not meet the required motor characteristics, is no longer necessary. Therefore, the manufacturing operation becomes easier and more productive.

The groove in the thin section can be formed without deep coining, which prevents the damage on the punch and eliminates the deformation of the magnetic pole due to the upwardly bent magnetic pole tooth piece of the stator core sheet.

Further, the grooves forming the thin sections are formed in the topside and the underside of the magnetic pole shaft piece, thereby preventing the magnetic pole piece from bending in one direction when the thin sections are formed. Preferably, the grooves in the topside and the underside of the magnetic pole shaft piece have the same radial length and are located in the same radial position.

BRIEF DESCRIPTION OF DRAWINGS

FIG. 1 (A) and FIG. 1 (B) are perspective views of a laminated stator core and a rotor core according to a first embodiment of the present invention, respectively.

FIG. 2 (A) is a plan view of a stator core sheet used for the laminated stator core.

FIG. 2 (B) is a cross-sectional view, taken along line A-A of FIG. 2 (A).

FIG. 4 (A) is a plan view of a stator core sheet used for a laminated stator core according to a second embodiment of the present invention.

FIG. 4 (B) is a cross-sectional view, taken along line B-B of FIG. 4 (A).

FIG. 4 (C) is a cross-sectional view of a stator core sheet used for a laminated stator core according to a third embodiment of the present invention.

FIG. 5 (A) and FIG. 5 (B) are cross-sectional views of grooves forming thin sections according to other embodiments of the present invention, respectively.

FIG. 9 (A) is a pattern diagram showing a change in the magnetic fluxes of the core sheets according to the depth of the groove, when the groove has a short length.

FIG. 9 (B) is a pattern diagram showing a change in the magnetic fluxes of the core sheets according to the depth of the groove, when the groove has a long length.

DESCRIPTION OF EMBODIMENTS

Figure 1A:
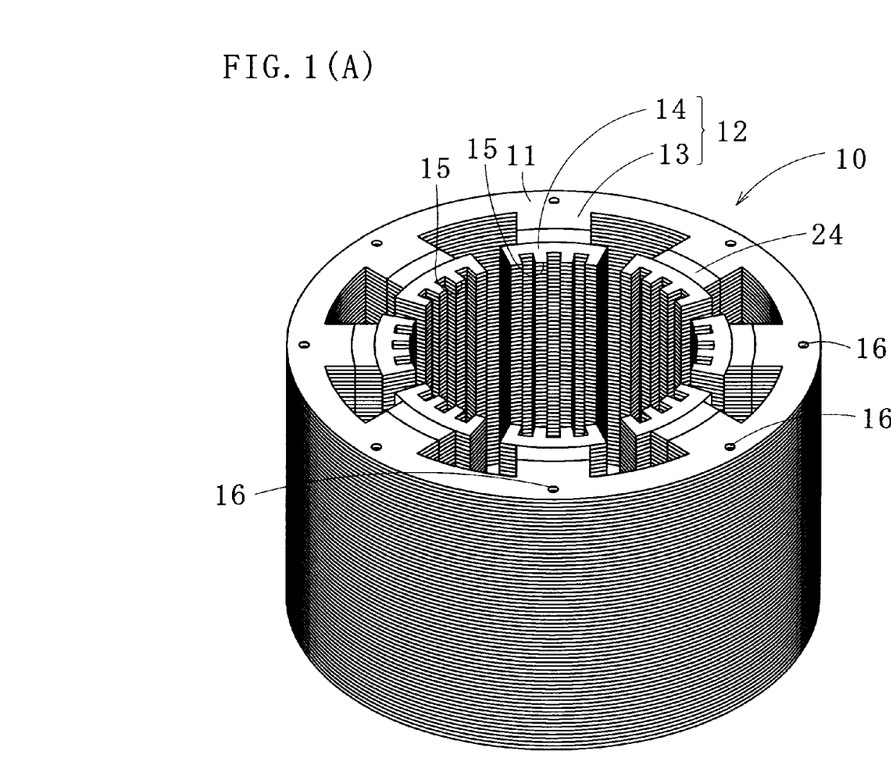

As shown in FIG. 1 (A), a laminated stator core 10 according to a first embodiment of the present invention, is used for a stator of a stepping motor, and includes a yoke section 11 and a plurality of magnetic pole sections 12 radially inside the yoke section 11. Each of the magnetic pole sections 12 includes a magnetic pole shaft section 13 and a magnetic pole tooth section 14. The magnetic pole shaft section 13, around which a wire is wound, has one end integrally connected to the yoke section 11. The magnetic pole tooth section 14 is formed radially inward of the magnetic pole shaft section 13, and includes a plurality of small teeth 15 radially inside thereof.

Figure 2A:
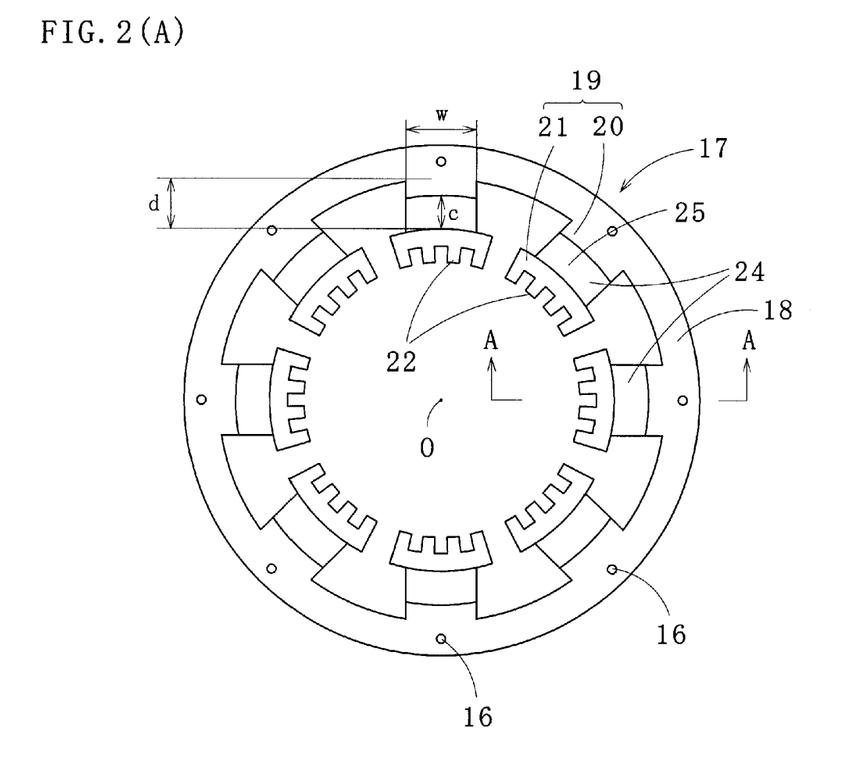
Figure 2B:
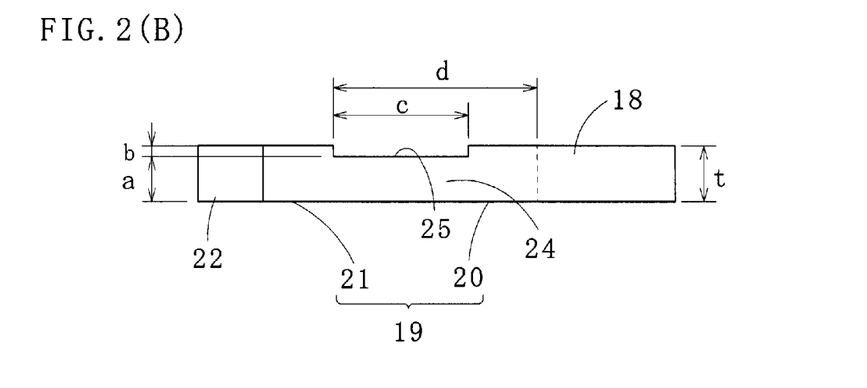

As shown in FIG. 2 (A) and FIG. 2 (B), the laminated stator core 10 is formed by laminating and caulking (interlocking) a plurality of stator core sheets 17 via well-known caulking (interlocking) portions 16. The stator core sheet 17 is produced from a magnetic metal sheet and has the same shape as the laminated stator core 10 viewed from the above. A yoke piece 18 is formed on a circumferential area of the stator core sheet 17, and includes a plurality of magnetic pole pieces 19 radially inside thereof. Each of the magnetic pole pieces 19 includes a magnetic pole shaft piece 20 and a magnetic pole tooth piece 21 radially inward the magnetic pole shaft piece 20. The magnetic pole tooth piece 21 includes small teeth 22 radially inward thereof. The magnetic pole shaft pieces 20 are laminated to form the magnetic pole shaft section 13, and each of the magnetic pole shaft pieces 20 may be a straight shape having a uniform width in a circumferential direction, or may have curved corners and a uniform width in a circumferential direction.

As shown in FIG. 2 (A) and FIG. 2 (B), the magnetic pole shaft piece 20 of the magnetic pole piece 19 has a thin section 24 located between a radially outward end and a radially inward end thereof. The thin section 24 is formed by pressing the magnetic pole shaft piece 20 in a thickness direction, and evenly elongating the same in the radially inward direction. A groove 25, having a rectangular cross-section, is formed in a topside of the thin section 24. A thickness "a" of the thin section 24 is 50-95% of a material thickness "t" (0.1-1.0 mm in this embodiment). A radial length "c" of the thin section 24 is 30-100% of a radial length "d" of the magnetic pole shaft piece 20. A depth "b" of the groove 25 is 5-50% of the material thickness "t," for example. In this embodiment, the grooves 25 (i.e., the thin sections 24) are a circular arc shape around a center "O" of the stator core sheet 17.

The caulking portion 16 may be half-pressed caulking (half-hollow rivet) or V-shaped caulking. The caulking portions 16 are provided in the yoke piece 18, but if desired, may be provided in the magnetic pole shaft pieces 20 excluding the thin sections 24 or the magnetic pole tooth pieces 21.

Figure 1B:
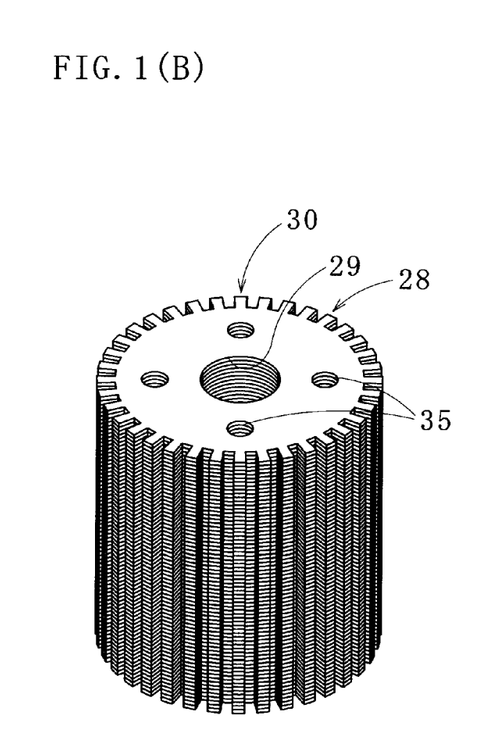

FIG. 1 (B) shows a rotor core 28 which forms a pair with the laminated stator core 10. The rotor core 28 includes a shaft hole 29 at a center and a plurality of teeth 30 on its periphery. A minimal gap is provided between edges of the tooth 30 and of the small tooth 15 of the laminated stator core 10, enabling the rotor core 28 to rotate inside the laminated stator core 10. (This structure is used for an electric motor).

Figure 3:
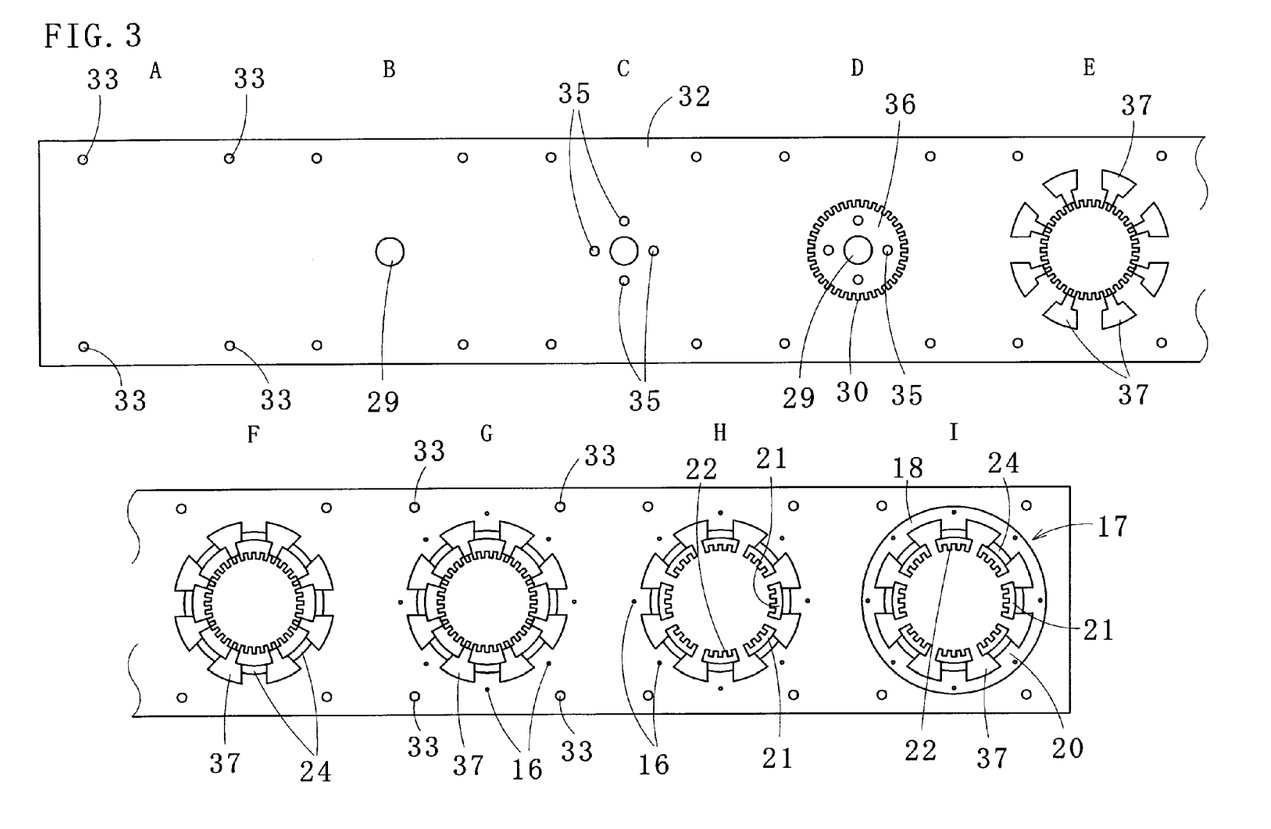
FIG. 3 is a process chart of a method for manufacturing the stator core sheet.

Referring to FIG. 3, a description will be given on a method for manufacturing the laminated stator core 10 including the stator core sheets 17.

As shown in FIG. 3, a manufacturing device for the laminated stator core using this manufacturing method has stations A-I. In the station A, pilot holes 33 are formed in a magnetic metal sheet 32. The magnetic metal sheet 32 is a lengthy material having a thickness of about 0.1-1.0 mm, for example.

In the station B, the magnetic metal sheet 32 is positioned with the four pilot holes 33, and the shaft hole 29 is formed therein.

In the station C, caulking portions 35 are formed around the shaft hole 29.

In the station D, an outline of the rotor core sheet 36 is punched out, and the rotor core sheet 36 is laminated inside the die (female die) to form the rotor core 28.

In the station E, slots 37 are punched out, forming outlines of each of the magnetic pole pieces 19 in the stator core sheet 17.

In the station F, each of the thin sections 24 is formed by coining a part of the magnetic pole shaft piece 20 in the magnetic pole piece 19. In this embodiment, the thin sections 24 are a circular arc shape, and located on the same circumference as a whole, in other words, the thin sections 24 have a common axis (center). However, the thin sections 24 may be a straight shape, and located on the same radial position as a whole. In addition, the rotor core sheet 36 and the stator core sheet 17 are concentrically formed.

As shown in FIG. 3, in the next station G, the caulking portions 16 are formed in the area of the yoke piece 18. If necessary, the caulking portions 16 can be formed radially inward of the magnetic pole shaft pieces 20.

In the station H, the magnetic pole tooth pieces 21 are punched out inside the magnetic pole pieces 19. The magnetic pole piece 19 is elongated radially inside, thus the magnetic pole tooth piece 21 having the small teeth 22 can be formed further radially inside.

In the station I, the outline of the stator core sheet 17 is punched out, and the stator core sheet 17 is interlocked and laminated inside the die (female die) to manufacture the laminated stator core 10.

Figure 4A:
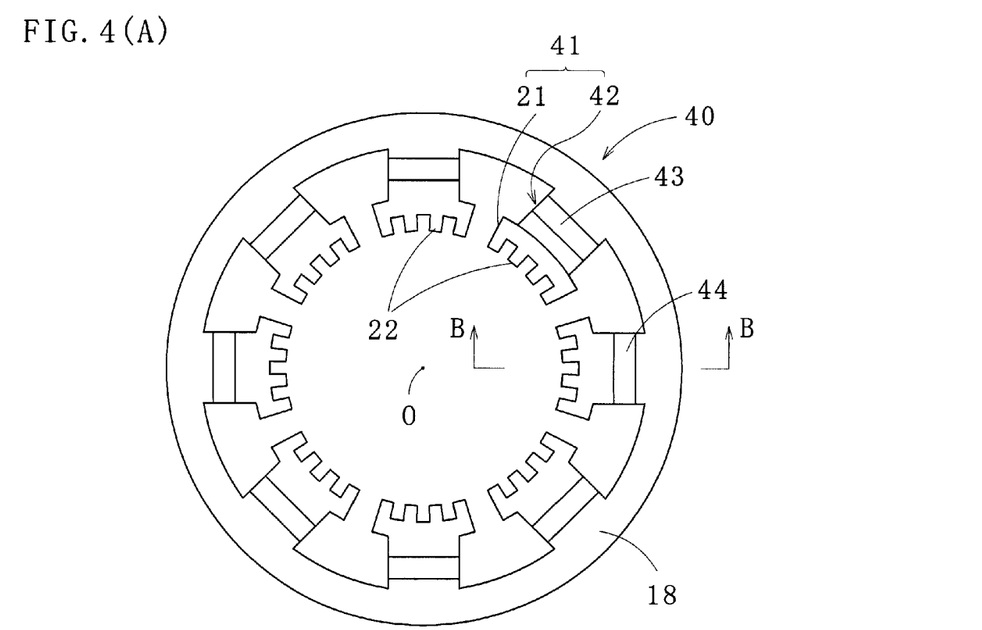
Figure 4B:
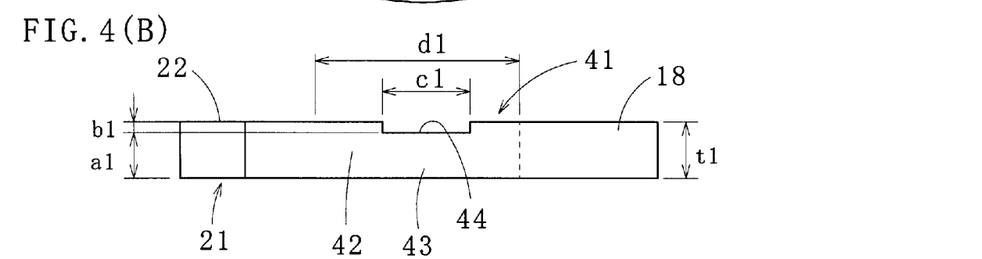

Referring to FIG. 4 (A) and FIG. 4 (B), a description will be given on a stator core sheet 40 used for a laminated stator core according to a second embodiment of the present invention. The same elements included in the stator core sheet 17 are given the same numerals, thus a detail explanation therefor is omitted. A manufacturing method of the stator core sheet 40 has the same processes as those of the stator core sheet 17, thus a detail explanation therefor is also omitted.

As shown in FIG. 4 (A), the stator core sheet 40 includes the circular yoke piece 18 and magnetic pole pieces 41 radially inside of the yoke piece 18. The magnetic pole pieces 41 include magnetic pole shaft pieces 42 and the magnetic pole tooth pieces 21. The magnetic pole shaft pieces 42 include thin sections 43 located on the same radial position. Each of the thin sections 43 includes a groove 44 in a topside. The groove 44 has parallel sidewalls, namely, the groove 44 is a straight groove, which can be formed with not a curved cutter, but an easy-to-produce straight cutter (punch).

As in the first embodiment, a thickness "a1" of the thin section 43 is 50-95% of a thickness "t1" of the magnetic metal sheet (0.1-1.0 mm in this embodiment). A radial length "c1" of the thin section 43 is 30-100% of a radial length "d1" of the magnetic pole shaft piece 42. In this embodiment, the thickness of the thin section 43 is thick, in other words, a depth "b1" of the groove 44 is shallow and the length "c1" of the groove 44 is long, which prevents an increase in magnetic resistances of the magnetic pole shaft piece 42. Therefore, a high-efficiency laminated stator core can be produced.

Figure 5A:
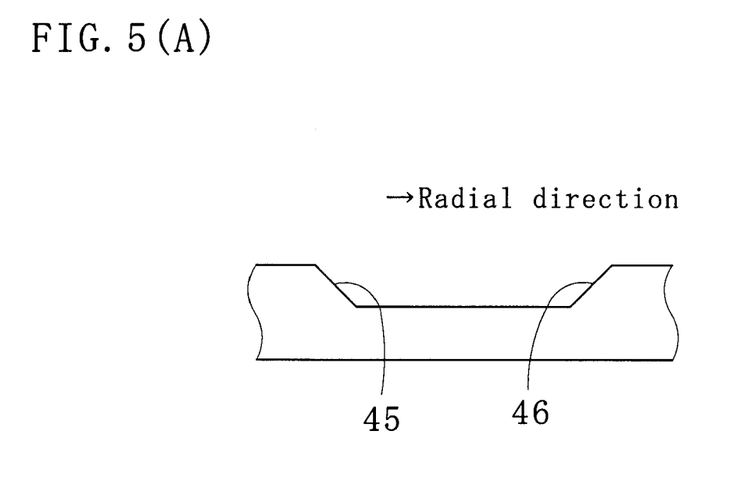
Figure 5B:
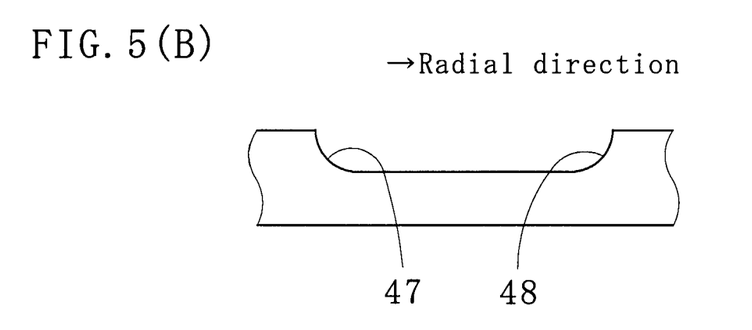

In the above-described first and second embodiments, the sidewalls (i.e., boundary sections radially adjoining to the thin section) of the groove 25 (44) forming the thin section 24 (43) are perpendicular to a bottom surface of the groove 25 (44). However, the sidewalls may have slanted surfaces 45, 46 as shown in FIG. 5 (A), or arcuate surfaces 47, 48 (having circular cross-sections) as shown in FIG. 5 (B). Alternatively, one of the sidewalls, a radially outward sidewall or a radially inward sidewall, may have the slanted surface or the arcuate surface.

Figure 4C:
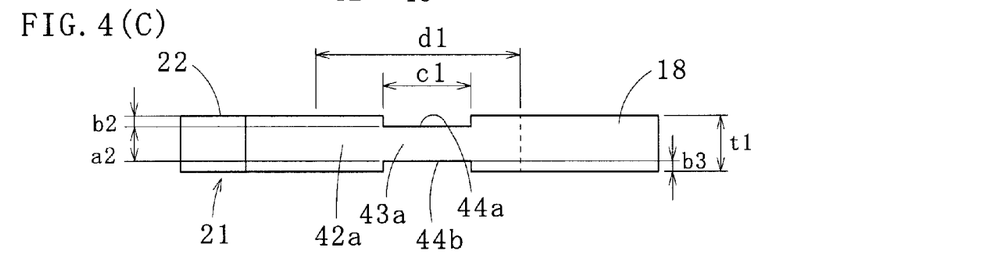

In the embodiments hereinabove, the groove 25 (44) forming the thin section 24 (43) is formed only in the topside of the magnetic pole shaft piece 20 (42). However, as shown in FIG. 4 (C), grooves 44a, 44b having the same radial length may be formed in a topside and a underside of a magnetic pole shaft piece 42a, respectively, so as to be located in the same radial position. In this case, a thickness "a2" of the thin section 43a, excluding a total depth "b2+b3" of the grooves 44a, 44b from the original material thickness "t1" of the magnetic pole shaft piece 42a, is within 50-95% of the material thickness "t1." Here, it is preferable to set "b2=b3."

The present invention is applicable to the cases that (a) the groove formed in the underside of the magnetic pole shaft piece, and (b) a plurality of the thin sections are formed in one magnetic pole shaft piece (e.g., the thin sections are formed in a row with a gap between the grooves).

First Experimental Example

To observe and confirm operation and effect of the present invention, a description will be given on an experiment using stepping motors including magnetic pole shaft pieces of 0.5 mm thickness and 2 mm length.

Figure 6:
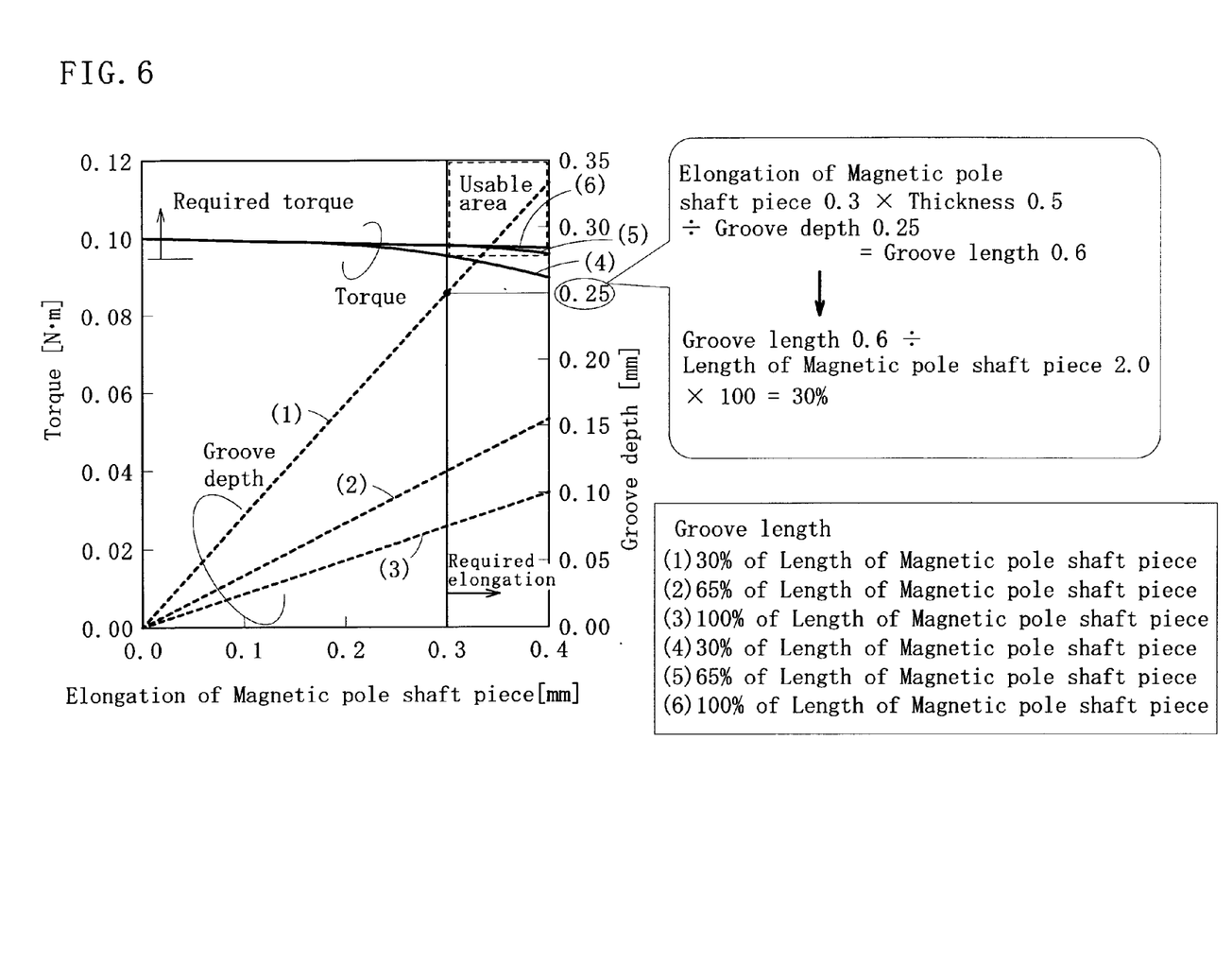
FIG. 6 is a graph showing (a) a relationship between depths of the grooves and elongations of magnetic pole shaft pieces, and (b) a relationship between torques of motors using the stator core sheets and the elongations of the magnetic pole shaft pieces, in the stator core sheets each having the groove of the different length.

FIG. 6 shows in a lower section ((1)-(3)) a relationship between (a) the depths of grooves (thin sections) each having a radial length of 30%, 65%, or 100% of that of the magnetic pole shaft piece and (b) the elongations of the magnetic pole shaft pieces. FIG. 6 shows in an upper section ((4)-(6)) a relationship between (b) the elongations of the magnetic pole shaft pieces and (c) torques (i.e., torques of the stepping motors).

In the first experimental experiment 1, to form both of the stator core sheet and the rotor core sheet with one die device, the magnetic pole shaft piece required to be elongated by a length of 0.30 mm or more at the formation of the thin section. Here, the following formula is approximately true: elongation=(a groove length×a groove depth)/a material thickness. When the radial length of the thin section was 30% of that of the magnetic pole shaft piece, the groove needed to be deep to secure the required elongation of the magnetic pole shaft piece, and therefore, the depth of the groove was 0.25 mm. The groove having the depth of 0.25 mm barely satisfied the conditions of use, by setting the radial length of the thin section to 30% of that of the magnetic pole shaft piece.

When the radial length of the thin section was 65% of that of the magnetic pole shaft piece, the depth of the groove needed to be 0.13 mm to form the elongation of 0.30 mm, and thus the required motor torque was obtained. When the radial length of the thin section was 100% of that of the magnetic pole shaft piece, the depth of the groove was 0.08 mm, and thus the required motor torque was obtained.

Second Experimental Example

Figure 7:
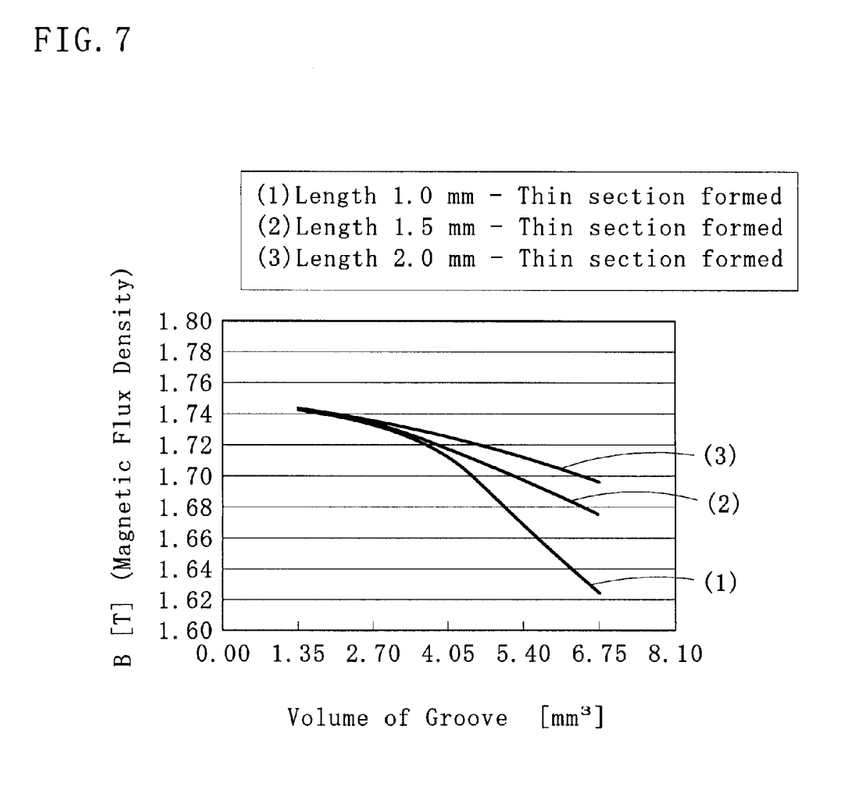
FIG. 7 is a graph showing a relationship between magnetic flux densities and volumes of the grooves, in the stator core sheets each having the groove of the different length.

In the second experimental experiment 2, a magnetic steel sheet having a 30 mm width, a 48 mm length, and a 0.5 mm thickness was used. FIG. 7 is a graph showing a relationship between (a) magnetic flux densities (T) of the grooves each having the length (i.e., the length of the thin section) of 1 mm, 1.5 mm, or 2 mm and (b) volumes of the grooves (the length of the groove×the depth of the groove×the width of the magnetic steel sheet), when a magnetic field with a strength of 5,000 A/m and a frequency of 50 Hz is applied to the magnetic steel sheet. According to the graph, even if the volume of the groove proportional to the elongation of the magnetic steel sheet is constant, the groove with a longer length can suppress the reduction in the magnetic density, which means that the reduction in the torque is low.

Figure 8:
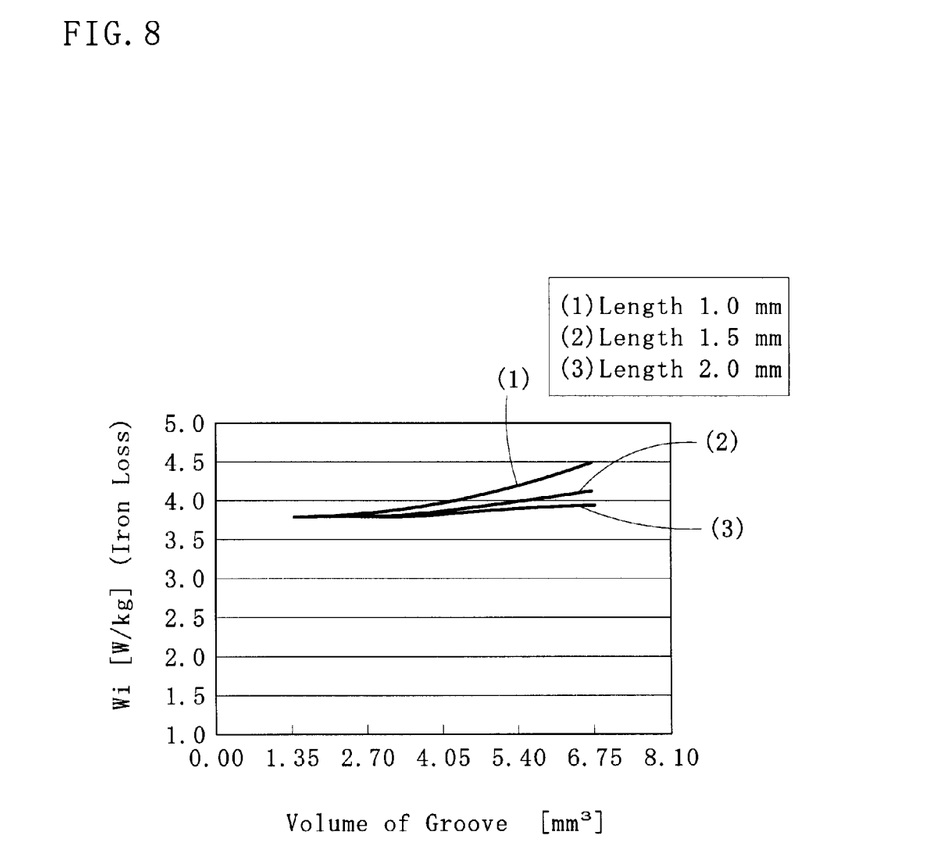
FIG. 8 is a graph showing a relationship between iron losses and the volumes of the grooves, in the stator core sheets each having the groove of the different length.

FIG. 8 shows a relationship between iron losses and volumes of the grooves under a magnetic field with a magnetic flux density of 1 T and a frequency of 50 Hz. According to FIG. 8, even if the volume of the groove is the same, the iron loss is increased as the length of the groove becomes shorter.

Figure 9A:
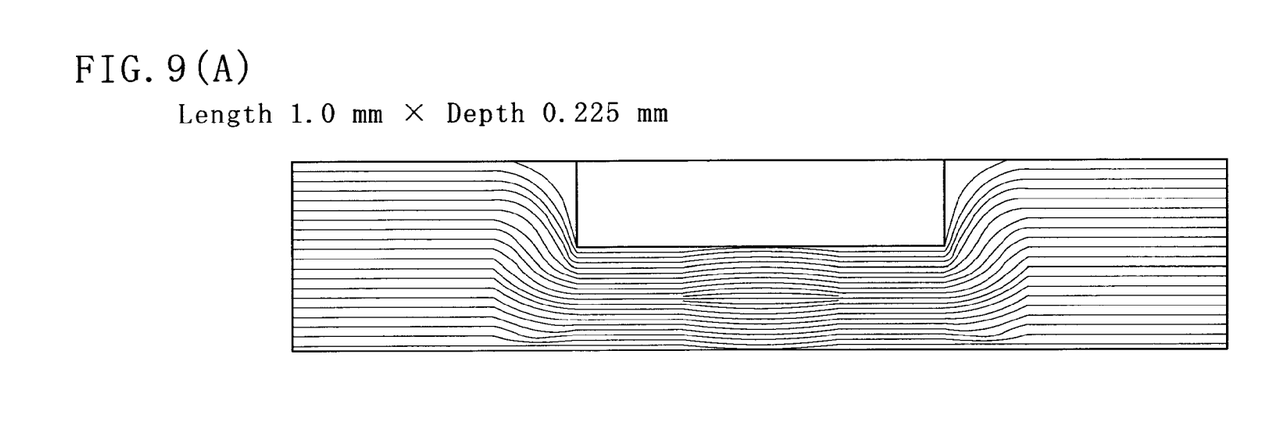
Figure 9B:
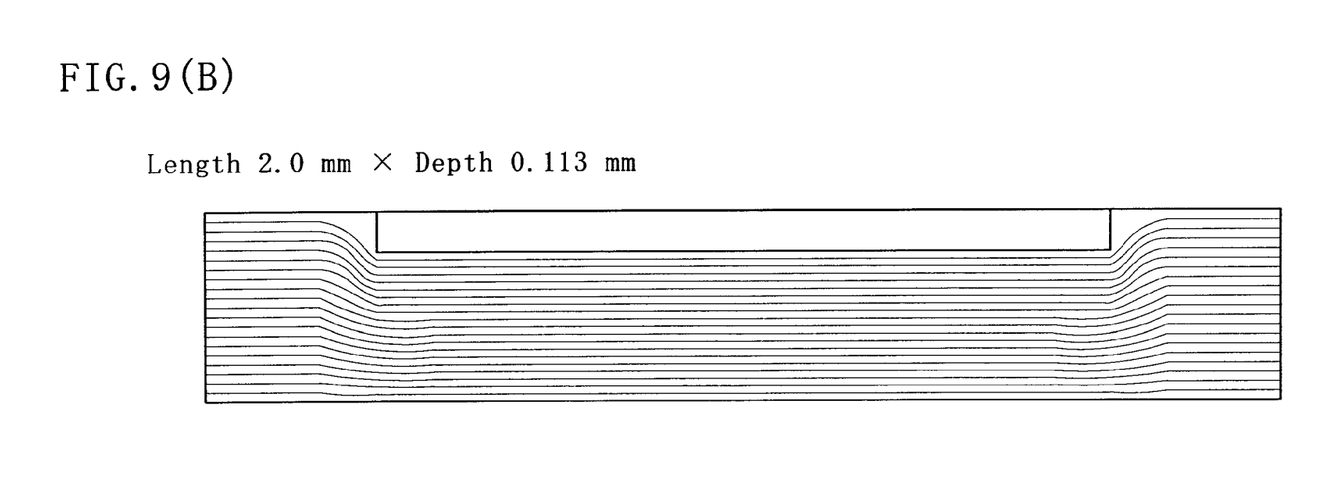

FIG. 9 is a pattern diagram showing changes in magnetic fluxes of the stator core sheets according to the depths of the grooves. As a result of an analysis on magnetic fields using the magnetic metal sheets each having the groove of the same volume, as shown in FIG. 9 (A) and FIG. 9 (B), the groove having the shorter length and the larger depth had high magnetic density partially, thereby increasing the iron loss, and further had the extremely large magnetic resistance partially, thereby decreasing the torque characteristics.

In view of the experiments hereinabove, the stator core sheet with higher magnetic characteristics can be obtained as the length of the grooves (the radial length of the thin sections) is longer and the depth of the grooves is shallower, if the grooves has the same volume.

INDUSTRIAL APPLICABILITY

According to the present invention, a rotor and a stator can be obtained from one magnetic metal sheet at one time, enabling an effective use of iron core materials. Therefore, a motor with high accuracy can be manufactured at a low cost.

REFERENCE SIGNS LIST

10: laminated stator core, 11: yoke section, 12: magnetic pole section, 3: magnetic pole shaft section, 14: magnetic pole tooth section, 15: small tooth, 16: caulking portion, 17: stator core sheet, 18: yoke piece, 19: magnetic pole piece, 20: magnetic pole shaft piece, 21: magnetic pole tooth piece, 22: small teeth, 24: thin section, 25: groove, 28: rotor core, 29: shaft hole, 30: tooth, 32: magnetic metal sheet, 33: pilot hole, 35: caulking portion, 36: rotor core piece, 37: slot, 40: stator core sheet, 41: magnetic pole piece, 42, 42a: magnetic pole shaft section, 43, 43a: thin section, 44, 44a, 44b: groove, 45, 46: slanted surface, 47, 48: arcuate surface

The invention claimed is:

1. A laminated stator core, formed by laminating stator core sheets, each of the stator core sheets punched out from a magnetic metal sheet so as to have a common axis with a rotor core sheet, the rotor core sheet punched out from the magnetic metal sheet before the stator core sheet is punched out, each of the stator core sheets comprising:
   a yoke piece;
   a plurality of magnetic pole shaft pieces integrally formed inside the yoke piece; and
   a magnetic pole tooth piece integrally formed inside each of the magnetic pole shaft pieces, wherein
   each of the magnetic pole shaft pieces is provided with a thin section, the thin section having a rectangular cross-section, the thin section is formed by pressing a part or a whole of the magnetic pole shaft piece in a thickness direction thereof, and elongating the same in a radially inward direction, and further wherein
   i) each of the thin sections has a thickness within 50-95% of that of the magnetic metal sheet;
   ii) each of the thin sections has a radial length within 65-100% of that of the magnetic pole shaft piece; and
   iii) a required elongation of the magnetic pole shaft piece is determined by a formula: (a groove length×a groove depth)/a material thickness.

2. The laminated stator core as defined in claim 1, wherein boundary sections radially adjoining to a groove forming the thin section have slanted surfaces or arcuate surfaces, the slanted surfaces or the arcuate surfaces continuing to a bottom surface of the groove.

3. The laminated stator core as defined in claim 1, wherein a groove forming the thin section is provided in a topside or an underside of the magnetic pole shaft piece.

4. The laminated stator core as defined in claim 1, wherein the thin section is formed by a straight groove.

5. The laminated stator core as defined in claim 3, wherein each of the grooves is a straight groove.

6. The laminated stator core as defined in claim 1, wherein each of the magnetic pole shaft pieces is provided with a plurality of grooves forming the thin sections.

* * * * *